United States Patent [19]

Hays et al.

[11] Patent Number: 5,325,496
[45] Date of Patent: Jun. 28, 1994

[54] SELECTABLE POINTER VALIDATION IN A COMPUTER SYSTEM

[75] Inventors: Kirk I. Hays, Hillsboro; Wayne D. Smith, Portland, both of Oreg.

[73] Assignee: Intel Corporation, Santa Clara, Calif.

[21] Appl. No.: 813,947

[22] Filed: Dec. 24, 1991

[51] Int. Cl.$^5$ .................... G06F 11/00; G06F 12/00; G06F 12/14
[52] U.S. Cl. .................... 395/400; 395/425; 395/575; 371/19
[58] Field of Search .................... 395/400, 425, 575; 371/19

[56] References Cited

U.S. PATENT DOCUMENTS

| | | | |
|---|---|---|---|
| 4,241,396 | 12/1980 | Mitchell et al. | 395/425 |
| 4,355,355 | 10/1982 | Butwell et al. | 395/400 |
| 4,766,535 | 8/1988 | Averbach et al. | 395/425 |
| 4,853,849 | 8/1989 | Bain, Jr. et al. | 395/375 |
| 5,093,785 | 3/1992 | Iijima | 395/400 |
| 5,093,914 | 3/1992 | Coplien et al. | 395/700 |
| 5,127,103 | 6/1992 | Hill et al. | 395/575 |
| 5,201,043 | 4/1993 | Crawford et al. | 395/400 |

*Primary Examiner*—Joseph L. Dixon
*Assistant Examiner*—Michael A. Whitfield
*Attorney, Agent, or Firm*—Blakely, Sokoloff, Taylor & Zafman

[57] ABSTRACT

A computer system is described having selectable pointer validation. The pointer structure is modified to provide selectable pointer validation. Each pointer comprises an effective address portion and a validation enable field. The effective address portion defines the memory location referenced by the pointer. The validation enable field comprises one or more bits of information that indicate whether or not selectable pointer validation is enabled for the particular pointer. Prior to executing a pointer reference, a processor first loads the desired condition of the validation enable field of the pointer. In normal practice of the invention, a programmer would enable selective pointer validation for particular pointers under debug testing or pointers for which a problem may have been encountered. For those pointers for which selective pointer validation is disabled, the pointer reference to the specified effective address occurs without any pointer validation processing. If, however, selective pointer validation is enabled by setting the appropriate value in the validation enable field, additional processing steps are performed by the present invention in order to validate the access being made by the pointer. The pointer access is validated by comparing the effective address portion of the pointer with pointer access information maintained in a pointer descriptor table. The pointer descriptor table contains a pointer descriptor for each allocated pointer. The pointer descriptor for each allocated pointer comprises pointer access information including a base address, a limit address, and access privilege information or a protection value.

16 Claims, 9 Drawing Sheets

SELECTABLE POINTER VALIDATION IN A COMPUTER SYSTEM

BACKGROUND OF THE INVENTION

1. Field of The Invention

The present invention pertains to the field of computer systems. Specifically, the present invention relates to the use of pointers in a computer system.

2. Prior Art

Pointers are used widely for processing information in a computer system. Pointers are references to data items, software functions, other pointers, or any other items (hereinafter referred to as objects) addressable by the address bus of the computer system. Pointers provide a convenient means for directly or indirectly referencing objects and thereby controlling processing flow. As long as pointers correctly reference the intended object, processing flows normally. However, error conditions may occur that cause pointers to incorrectly reference the wrong location. Errors of this type are sometimes called wild pointer references. Wild pointer references are particularly difficult to detect and trace because a wild reference may not be isolated to a predictable portion of the address space within the computer system. For this reason, techniques have been developed in the prior art for tracing wild pointer references by validating pointer references.

One method used in the prior art for detecting and tracing wild references is the use of a defined pointer space in memory in which all objects under debug must reside. In this prior art implementation, pointer reference validation is based on whether a pointer references a location within the defined pointer space or not within the pointer space. When the pointer validation function is enabled, pointer references within the pointer space are validated and allowed to continue. Pointer references outside the defined pointer space are trapped as being wild references that are terminated with an error condition.

In a second prior art implementation, pointer validation may be performed on an object basis. In this second prior art implementation, each reference by any pointer to an object under debug is validated. Validation is performed by comparing the destination address of the pointer reference with the known location of the object under debug. If the reference matches the object location, the pointer reference is validated and allowed to continue. A mismatch between the pointer reference and the object location produces an error condition and the reference is terminated.

Several problems exist in both of the prior art implementations. The first method can be very fast, however, not very accurate. Although wild references outside the defined pointer space will be trapped, wild references to the wrong location but still within the defined pointer space will not be trapped. Thus, the first method will not catch all error conditions.

The second method tends to be very accurate, but also very slow. Because the second prior art method validates every pointer reference to an object, the system overhead for a reference to an object is greatly increased and overall system performance of the computer system is significantly decreased.

Thus, a better means is needed for validating pointer references in a computer system.

SUMMARY OF THE INVENTION

The present invention provides a means and a method for selectable pointer validation in a computer system. The efficiency of a computer system is increased by selectively validating individual pointer references without the need for validating every reference to a pre-determined address space or every reference to a particular object.

In the present invention, the pointer structure is modified to provide selectable pointer validation. Each pointer comprises an effective address portion and a validation enable field. The effective address portion defines the memory location referenced by the pointer. The validation enable field comprises one or more bits of information that indicate whether or not selectable pointer validation is enabled for the particular pointer.

Prior to executing a pointer reference, a processor first loads the desired condition of the validation enable field of the pointer. In normal practice of the invention, a programmer would enable selective pointer validation for particular pointers under debug testing or pointers for which a problem may have been encountered. For those pointers for which selective pointer validation is disabled, the pointer reference to the specified effective address occurs without any pointer validation processing. If, however, selective pointer validation is enabled by setting the appropriate value in the validation enable field, additional processing steps are performed by the present invention in order to validate the access being made by the pointer. The pointer access is validated by comparing the effective address portion of the pointer with pointer access information maintained in a pointer descriptor table. The pointer descriptor table contains a pointer descriptor for each allocated pointer. The pointer descriptor for each allocated pointer comprises pointer access information including a base address, a limit address, and access privilege information or a protection value. The base address defines the lower address limit below which the corresponding pointer is not allowed to access. The limit address specifies the upper address limit above which the corresponding pointer is not allowed to access. The combination of the base address and limit address defines an address region or space within which the corresponding pointer is allowed access. In an alternative embodiment, additional addresses may be provided within the pointer descriptor for each pointer for the purpose of defining a plurality of address regions corresponding to a particular pointer. In this way, more complex pointer access structures may be provided.

The protection value of the pointer descriptor defines the level of access the corresponding pointer has to the address region defined by the base address and the limit address. In the preferred embodiment, the protection value defines whether the corresponding pointer has read, write, and/or execute privileges in the address space defined by the base address and the limit address. By setting preassigned bits of the protection value to specified values, access privileges for the corresponding pointer may be encoded. Read access corresponds to the privilege of the corresponding pointer to be used to read information from a location within the address space defined by the base address and the limit address. Write access privilege is used to enable or disable the corresponding pointer for use in writing information into a location within the memory address region defined by the base address and the limit address. Execute access privilege is used to enable or disable the use of the corresponding pointer in referencing an instruction for execution from a location within the address space defined by the base address and the limit address.

It is, therefore, an object of the present invention to provide a computer system wherein pointer validation may be performed on a pointer by pointer basis. It is a further object of the present invention to provide a computer system wherein selectable pointer validation is performed for some but not all pointer references to a single object. It is a further object of the present invention to provide a computer system wherein a means for enabling or disabling a pointer validation operation for a particular location is encoded within a pointer reference itself. It is a further object of the present invention to provide a computer system wherein one or more bits of the pointer are used for enabling or disabling validation of the pointer. It is a further object of the present invention to provide a computer system wherein selectable pointer validation may be performed without the need for objects to be located within a predetermined address space. These and other objects of the present invention will become apparent as illustrated and described in the following detailed description of the preferred embodiment.

DETAILED DESCRIPTION OF THE PREFERRED EMBODIMENT

The present invention is a computer system providing a means and a method for selectable pointer validation.

In the following description, numerous specific details are set forth in order to provide a thorough understanding of the invention, however, it will be apparent to one of ordinary skill in the art that these specific details need not be used to practice the present invention. In other circumstances, well known structures, circuits, and interfaces have not been shown in detail in order not to unnecessarily obscure the present invention.

Figure 1:
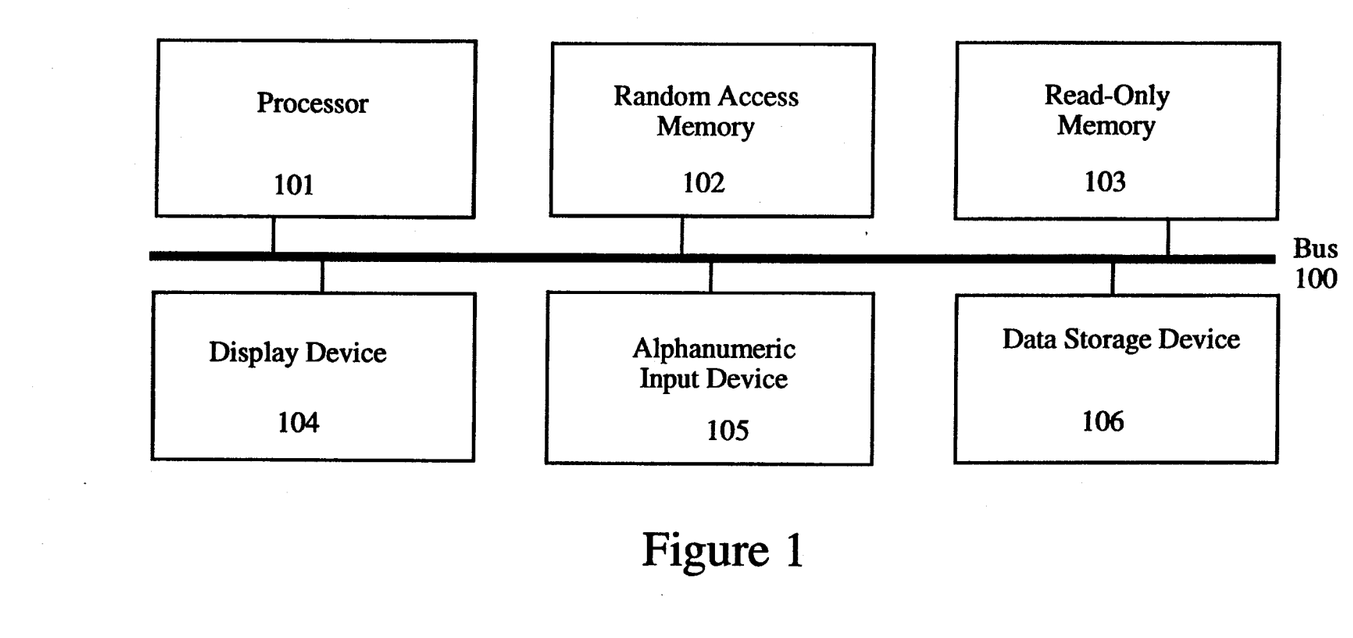
FIG. 1 is an illustration of a typical computer system used with the present invention.

Referring to FIG. 1, a block diagram of the architecture of a typical computer system in which the present invention operates is illustrated. In general, such computer systems, as illustrated by FIG. 1, comprise a bus 100 for communicating information, a processor 101 coupled with the bus for processing information, a random access memory (RAM) 102 coupled with the bus 100 for storing information and instructions for the processor 101, a read only memory (ROM) 103 coupled with the bus 100 for storing static information and instructions for the processor 101, and optionally, a display device 104 such as a video display terminal or a liquid crystal display device coupled to the bus 100 for displaying information to a computer user, an input device such as alphanumeric input device 105 coupled to the bus 100 for communicating information and command selections to the processor 101, and a data storage device 106 such as a magnetic disk and disk drive coupled with the bus 100 for storing information and instructions for processor 101.

Figure 2:
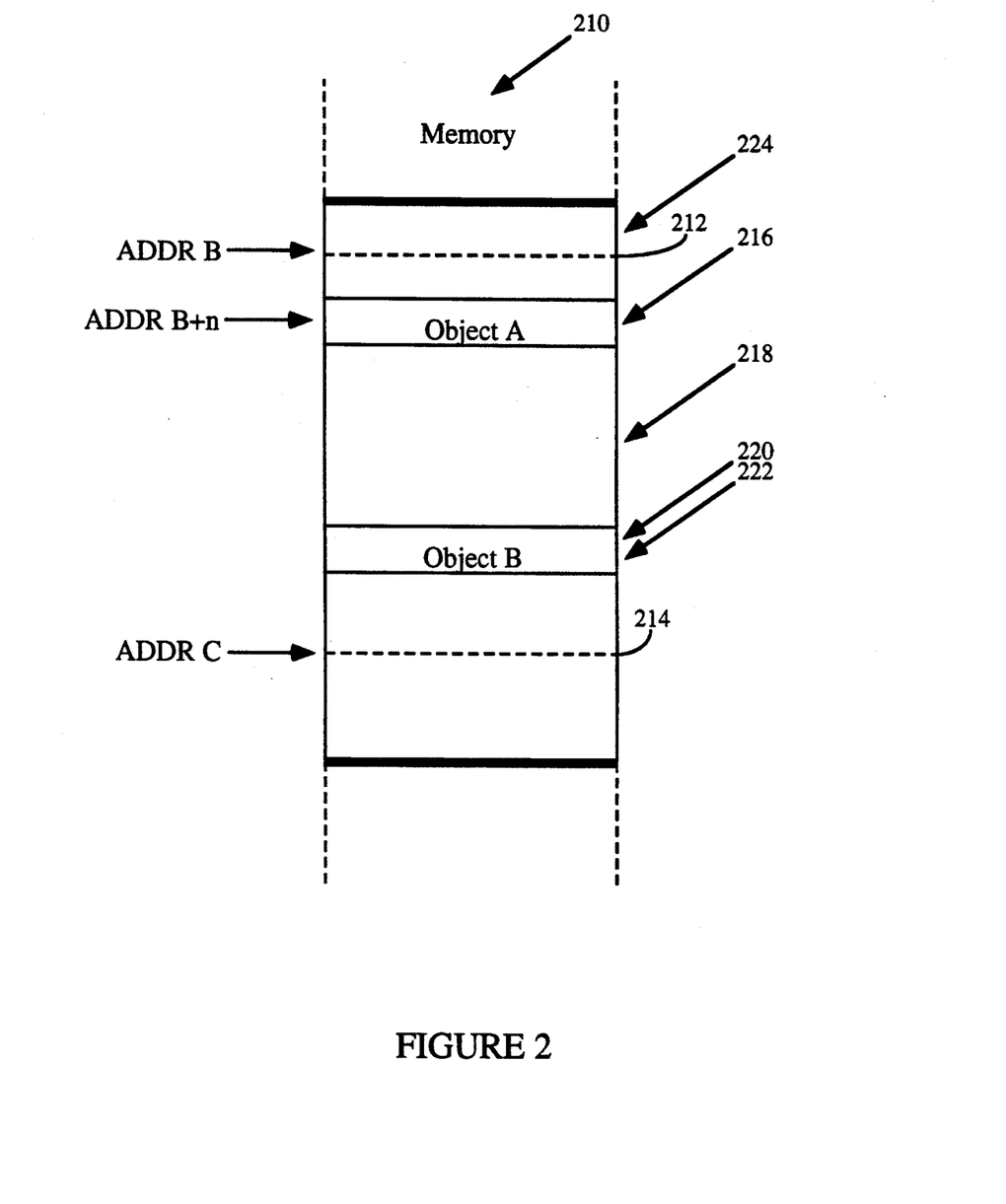
FIG. 2 is an illustration of objects and pointers within the memory of a computer system.

Referring now to FIG. 2, a portion of memory 210 within random access memory 102 is illustrated. Memory portion 210 comprises a set of sequentially addressed memory locations in which information may be stored. This information includes objects which comprise data items, executable processing logic (i.e. code), other pointers, or any other item that may be referenced using the address bus or address bits provided by the computer system. Two examples of such objects are illustrated in FIG. 2: Object A and Object B. An example of a pointer reference to Object A at memory location ADDR B+n is illustrated by line 216 in FIG. 2. Similarly, pointer references to Object B are shown by lines 220 and 222. Other pointers, such as lines 218 and 224, may point to other objects (not shown) of memory portion 210. In general, pointers are references to specific objects as specified by the address of the object in memory.

It is important to ensure that pointers reference the correct object in memory portion 210. Pointers that reference the incorrect location, denoted wild references, must be detected and corrected in order to prevent failure of the computer system. The process of detecting a wild pointer reference is called pointer validation.

Two forms of pointer validation exist in the prior art. In a first prior art implementation, a defined pointer space is defined in memory portion 210. Such a defined pointer space is identified by dotted lines 212 at memory location ADDR and 214 at memory location ADDR C. The area of memory portion 210 between lines 212 and 214 is denoted the defined pointer space. Areas of memory portion 210 above line 212 or below line 214 are outside or beyond the defined pointer space. In the first prior art implementation, pointer references within the defined pointer space (i.e. pointer references 216, 218, 220, and 222 of FIG. 2) are validated as being correct (i.e. valid) pointer references. Pointer references outside the defined pointer space, such as pointer reference 224, are determined to be wild pointer references that are trapped and terminated with an error condition.

In a second prior art implementation, any pointer reference to a specified object under debug, such as Object B, may be validated by comparing each pointer reference to the known location of the object in memory. For the example of FIG. 2, pointer references 220 and 222 both reference Object B. As either pointer reference 220 or pointer reference 222 is initiated, the address referenced by the pointer is compared with the location of the object in memory. If the pointer reference matches the location of the object, the pointer reference is validated and allowed to complete successfully. If the pointer reference does not match the object location, the reference is terminated with an error condition. It will be apparent to those skilled in the art that many other pointer references to a particular object will likely occur. It is, therefore, advantageous to provide a means for selectively validating individual pointer references without the need for validating each and every reference to a particular object.

Figure 3A:
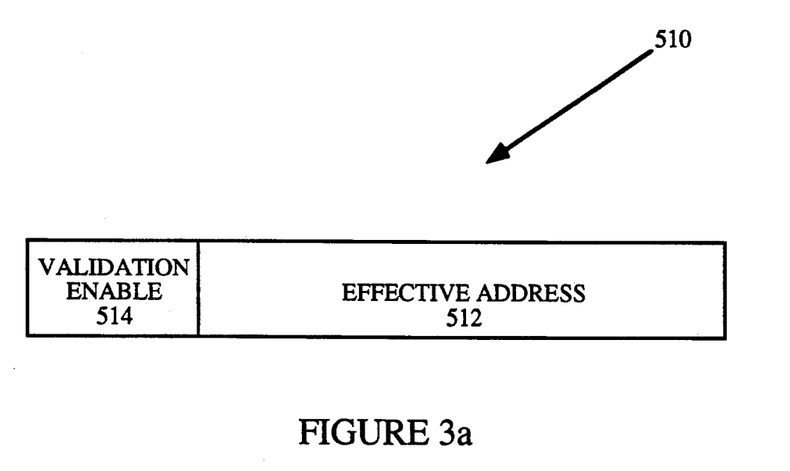
FIGS. 3a and 3b illustrate the structure of a pointer in two alternative embodiments.

Referring now to FIG. 3a, the pointer structure of the preferred embodiment is illustrated. Pointer 510 comprises an effective address portion 512 and a validation enable field 514. The effective address portion 512 defines the memory location referenced by the pointer. The validation enable field 514 comprises one or more bits of information that indicate whether or not selectable pointer validation is enabled for the particular pointer 510. In the preferred embodiment, validation enable field 514 is a single bit of information that is set to a value of one to enable selective pointer validation and set to a zero value to disable selective pointer validation. It will be apparent to those skilled in the art that additional bits of information within validation enable field 514 may be provided. It will also be apparent to those skilled in the art that the bit or bits within the validation enable field 514 may concurrently be used to define a portion of the effective address 512. In the preferred embodiment, however, the pointer 51.0 will be mapped to the same effective address regardless of the condition of bits within validation enable field 514. By providing a validation enable field 514 for each and every pointer, pointer validation for individual pointers may be selectively enabled or disabled.

Figure 3B:
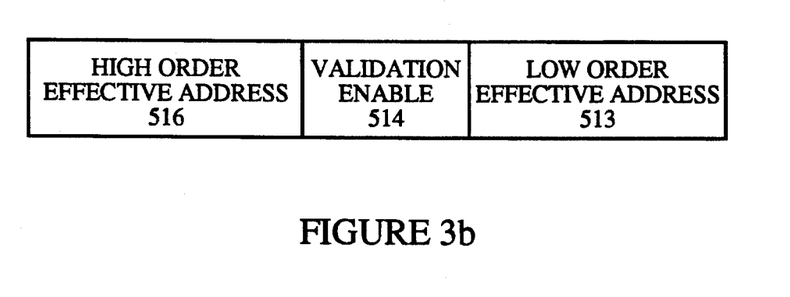

Referring now to FIG. 3b, an alternative embodiment for the structure of a pointer is illustrated. In FIG. 3b, the effective address is segmented into a low order portion 513 and a high order portion 516. Between the high order effective address portion 516 and the low order effective address portion 513, the validation enable field 514 is positioned. Again, the validation enable field 514 of FIG. 3b comprises a bit or bits that are used to selectively enable pointer validation for the pointer.

Figure 3C:
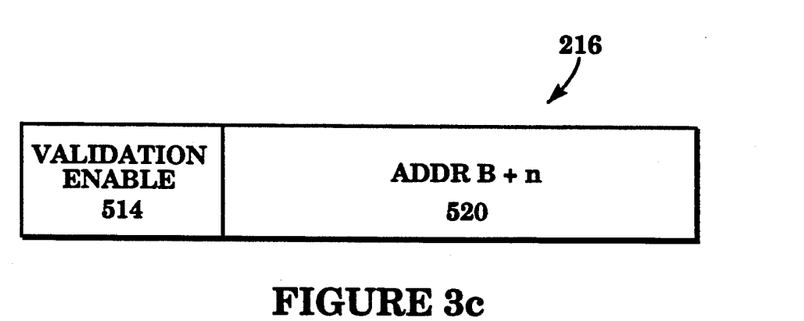
FIG. 3c illustrates a specific example of the structure of a pointer in one embodiment.

FIG. 3c illustrates the structure of a specific pointer, pointer 216 from FIG. 2, as an example. As above, pointer 216 comprises a validation enable field 514 and an effective address portion 520. The effective address portion defines the memory location referenced by the pointer, in this case, memory location ADDR B+n.

Prior to executing a pointer reference, processor 101 first loads the desired condition of validation enable field 514 of the pointer. In normal practice of the invention, a programmer would enable selective pointer validation for particular pointers under debug testing or pointers for which a problem may have been encountered. For those pointers for which selective pointer validation is disabled, the pointer reference to the specified effective address occurs without any pointer validation processing. If, however, selective pointer validation is enabled by setting the appropriate value in validation enable field 514, additional processing steps are performed by the present invention as described below in relation to FIGS. 4b, 5a, 5b, 5c, 6a, and 6b.

Figure 4A:
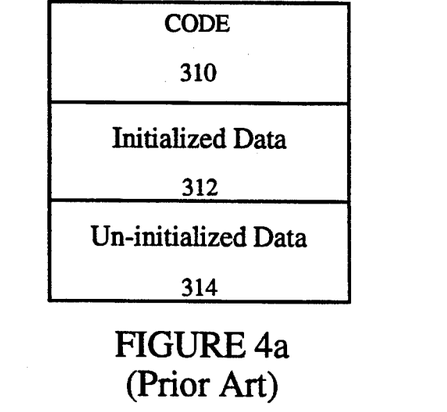
FIG. 4a is an illustration of a prior art object module.

Referring now to FIG. 4a, a prior art object module is illustrated. An object module is a compiled or assembled portion of processing logic comprising a code portion 310, an initialized data portion 312, and an uninitialized data portion 314. The usage of the word "object" in the object module context is not to be confused with the use of the word "object" in relation to FIG. 2. Code portion 310 comprises a set of processor executable instructions for carrying out a software implemented process. Initialized data portion 312 comprises a set of preset values associated with specified data items. Uninitialized data portion 314 comprises reserved data areas for data items for which no initial preset values are defined. The structure and use of an object module such as that illustrated in FIG. 4a is well known to those of ordinary skill in the art.

Figure 4B:
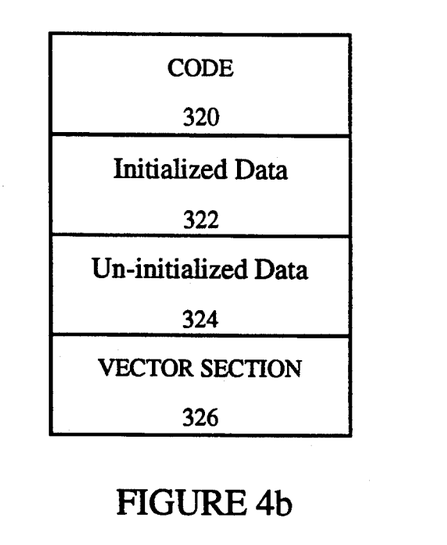
FIG. 4b is an illustration of the object module used in the preferred embodiment.

Referring now to FIG. 4b, the prior art object module structure is shown with the addition of vector section 326. Vector section 326 is provided and used by the present invention to implement selectable pointer validation. The content and structure of vector section 326 is illustrated in FIGS. 5a, 5b, and 5c, with individual examples illustrated in FIGS. 5d and 5e.

Figure 5A:
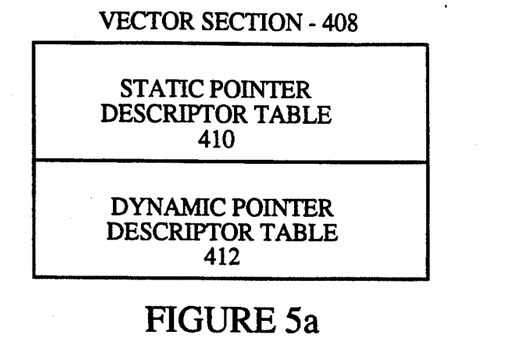
FIG. 5a is an illustration of the vector section used within the object module of the preferred embodiment.

Referring now to FIG. 5a, the general structure of vector section 408 is illustrated. Vector section 408 comprises a static pointer descriptor table 410 and a dynamic pointer descriptor table 412. At compile or assembly time, pointers may be declared and statically allocated as part of the object module generated for the compiled or assembled software. These statically created pointer allocations or descriptors are stored in static pointer descriptor table 410.

Once a compiled or assembled object module is linked, loaded, and executed, the processing logic provided by the executing software may cause the dynamic creation or allocation of pointers during run time operation of the system. By way of example, dynamic allocation of pointers may occur in a multi-tasking system when a new task is created. Dynamic pointers may be created at run time in many other situations as well. In each case, pointers allocated at run time are stored in dynamic pointer descriptor table 412.

Figure 5B:
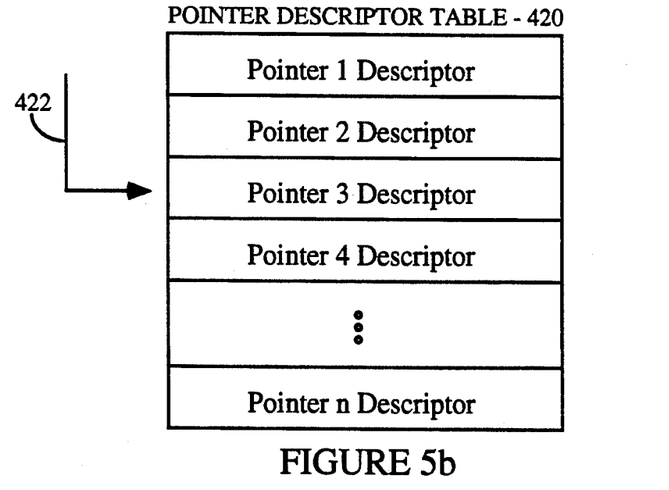
FIG. 5b illustrates the structure of the pointer descriptor table within the vector section of the object module of the preferred embodiment.
Figure 5C:
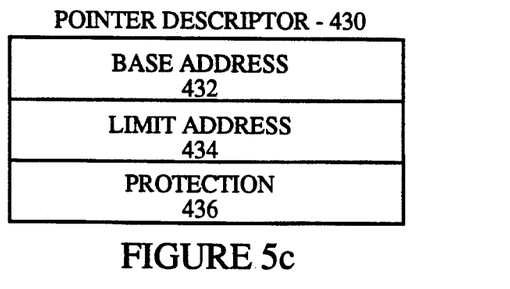
FIG. 5c illustrates the structure of pointer descriptors that reside within the pointer descriptor table.

Referring now to FIG. 5b, the structure of the pointer descriptor table 420 maintained within both static pointer descriptor table 410 and dynamic pointer descriptor table 412 is illustrated. The pointer descriptor table 420 comprises a plurality of pointer descriptors. Whether created statically or dynamically, a pointer descriptor for each allocated pointer is maintained either in static pointer descriptor table 410 or dynamic pointer descriptor table 412. Thus, the same or similar structure illustrated in FIG. 5b is maintained for both static pointer descriptor table 410 and dynamic pointer descriptor table 412.

Each pointer descriptor table 410 and 412 comprises a sequential list of pointer descriptors each associated with a distinct pointer. The appropriate pointer descriptor is sequentially indexed using an index associated with the pointer and defined when the pointer is allocated. The preferred implementation for providing this index value associated with each pointer is to generate a load register instruction that loads a processor register with a predefined index value uniquely associated with each allocated pointer. Upon reference to a pointer, the unique index value may be retrieved and used to index into the pointer descriptor table 420 as indicated by arrow 422. When properly indexed, the appropriate pointer descriptor for the referenced pointer may be retrieved and used during the process of validating a pointer reference.

Referring now to FIG. 5c, the content and structure of each pointer descriptor within pointer descriptor table 420 is illustrated. The pointer descriptor for each allocated pointer comprises pointer access information including a base address 432, a limit address 434, and access privilege information or a protection value 436. Base address 432 defines the lower address limit below which the corresponding pointer is not allowed to access. Limit address 434 specifies the upper address limit above which the corresponding pointer is not allowed to access. The combination of base address 432 and limit address 434 defines an address region or space within which the corresponding pointer is allowed access.

Protection value 436 of pointer descriptor 430 defines the level of access the corresponding pointer has to the address region defined by base address 432 and limit address 434. In the preferred embodiment, protection value 436 defines whether the corresponding pointer has read, write, and/or execute privileges in the address space defined by base address 432 and limit address 434. By setting preassigned bits of protection value 436 to specified values, access privileges for the corresponding pointer may be encoded. Read access corresponds to the privilege of the corresponding pointer to be used to read information from a location within the address space defined by the base address 432 and limit address 434. Write access privilege is used to enable or disable the corresponding pointer for use in writing information into a location within the memory address region defined by the base address 432 and limit address 434. Execute access privilege is used to enable or disable the use of the corresponding pointer in referencing an instruction for execution from a location within the address space defined by the base address 432 and limit address 434. Means for encoding read, write, and execute protection values into a bit string are well known in the art.

A pointer descriptor 430 is provided within the pointer descriptor table 420 for each of the allocated pointers as illustrated in FIG. 5b. Thus, each pointer allocated either statically or dynamically has a corresponding pointer descriptor comprising a base address, a limit address, and a protection value. Similarly, each allocated pointer has a corresponding index (not shown) for use in locating the pointer descriptor for the corresponding pointer within the pointer descriptor table 420.

Figure 5D:
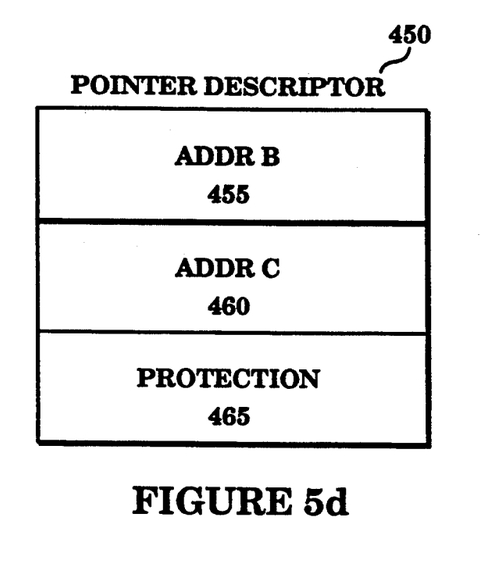
FIG. 5d illustrates a specific example of the structure of a pointer descriptor that resides within the pointer descriptor table.

Referring now to FIG. 5d, a specific example of a pointer descriptor is illustrated. This pointer descriptor, which could be for pointer 216 in FIG. 2, has base address 455 of ADDR B, limit address 460 of ADDR C, and protection field 465.

Figure 5E:
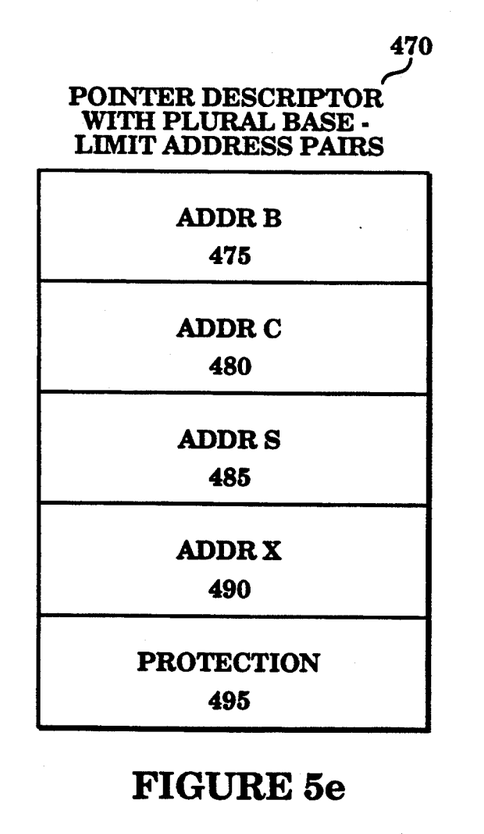
FIG. 5e illustrates a specific example of the structure of a pointer descriptor with plural base-limit address pairs that resides within the pointer descriptor table.

Referring now to FIG. 5e, a specific example of a pointer descriptor in an alternative embodiment is illustrated. In this alternative embodiment, additional addresses may be provided within pointer descriptor 470 for each pointer for the purpose of defining a plurality of address regions corresponding to a particular pointer. In this example, two such regions are shown defined by a first base address 475 of ADDR B, a first limit address 480 of ADDR C, and a second base address 485 of ADDR S and a second limit address of ADDR X. Although only two regions are illustrated in this example, it will be apparent to one of ordinary skill in the art that additional regions may be defined.

Figure 6A:
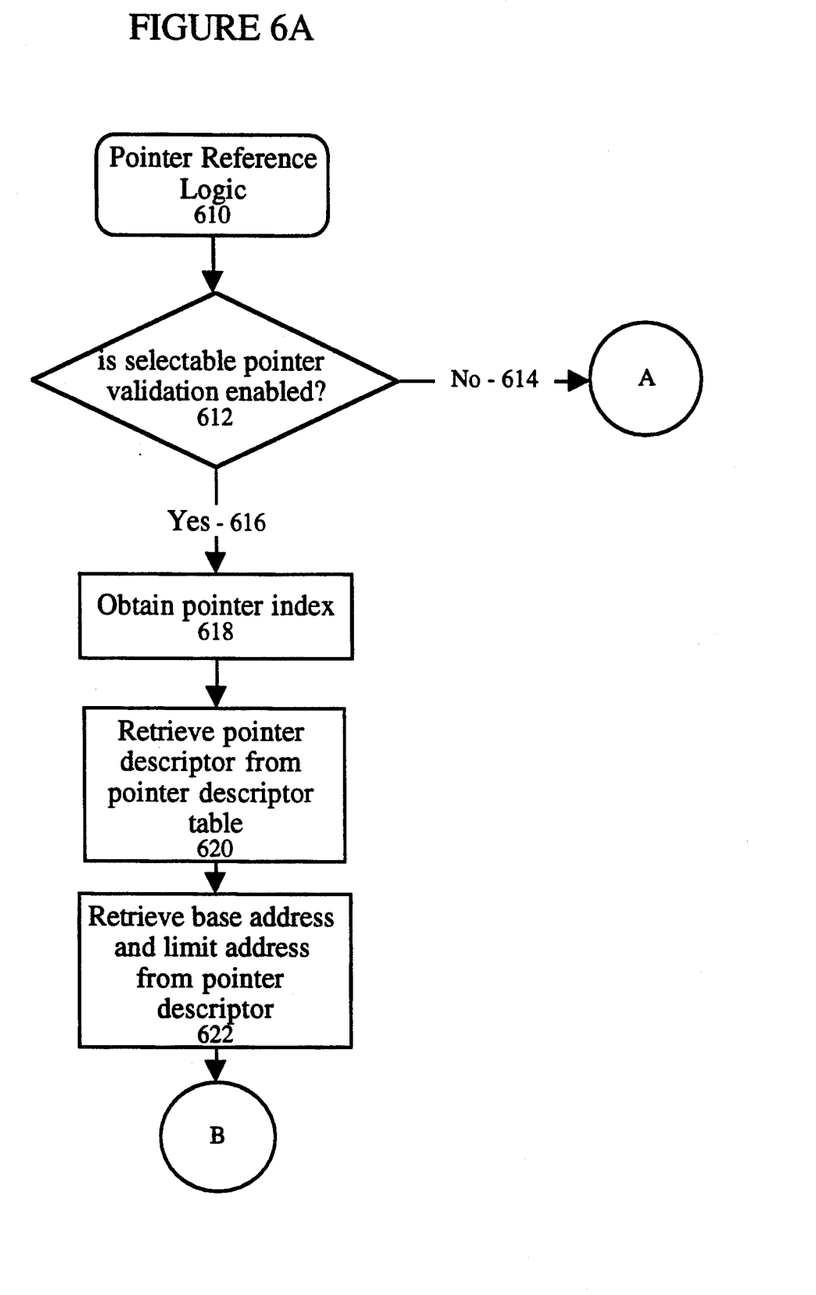
FIG. 6a and 6b are flow charts of the processing performed by the present invention.
Figure 6B:
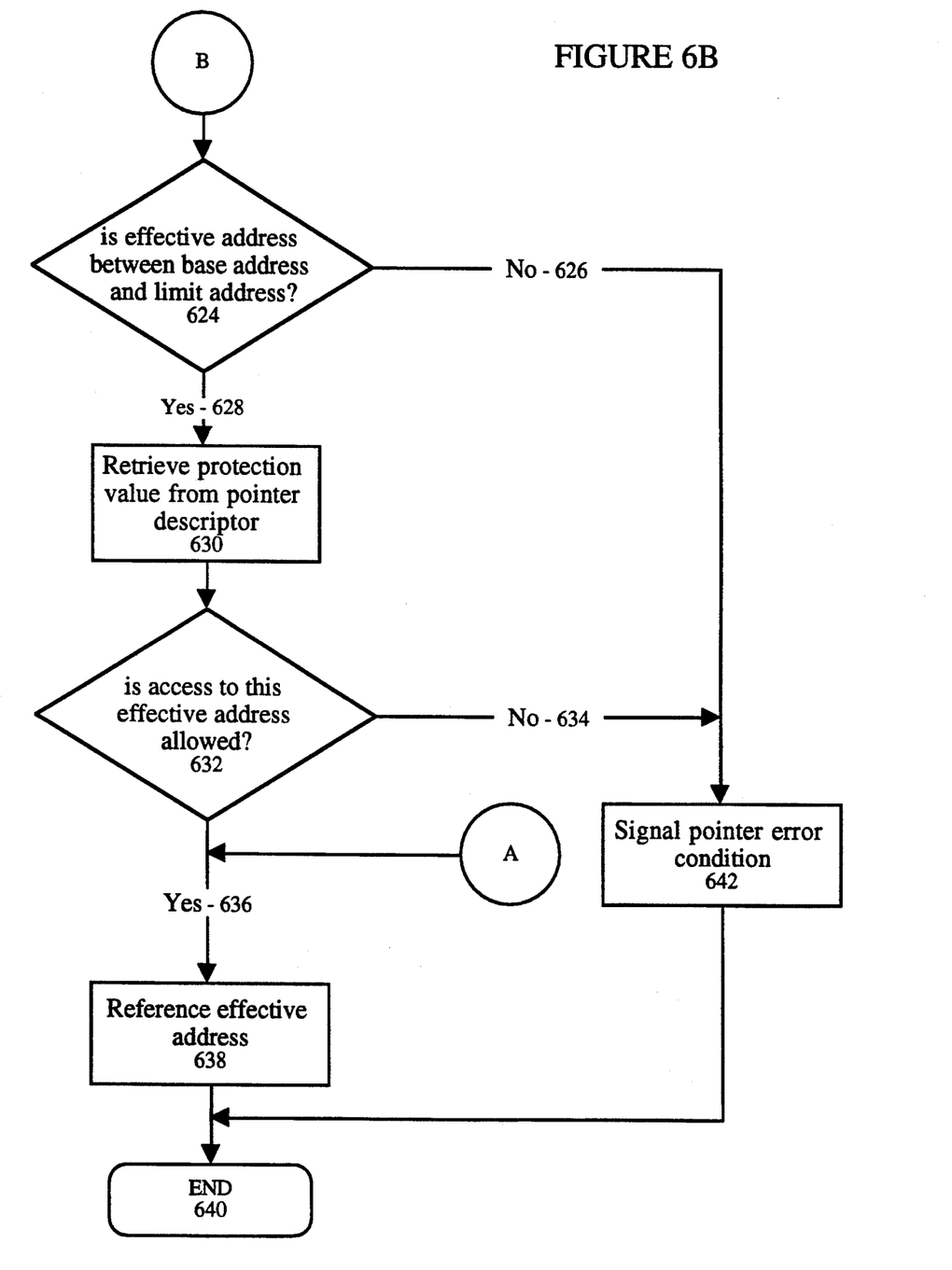

Referring now to the FIGS. 6a and 6b, flow charts illustrating the processing logic of the present invention are illustrated. Referring to FIG. 6a, the processing logic executed by processor 101 for each pointer reference is illustrated starting at bubble 610. First, the validation enable field of the referenced pointer is retrieved and tested in decision block 612. If the validation enable field for this pointer is set to disable selective pointer validation, processing path 614 is taken to the bubble labeled A as illustrated in FIG. 6b. If, however, the validation enable field 514 of this pointer is set to enable selective pointer validation, processing path 616 is taken to processing block 618 where the pointer descriptor index for this pointer is obtained from a preloaded processor register. Using the pointer descriptor index, the pointer descriptor for this pointer is retrieved from the pointer descriptor table in processing block 620. The base address and limit address are retrieved from the pointer descriptor in processing block 622. Processing continues at the bubble labeled B as illustrated in FIG. 6b.

Referring now to FIG. 6b, the pointer effective address is compared with the base addresses and limit address retrieved from the pointer descriptor. If the effective address for this pointer is between the base address and limit address as defined in the pointer descriptor, processing path 628 is taken and the protection value is retrieved from the pointer descriptor in processing block 630. If the access for which the current pointer is being used is authorized by the protection value retrieved from the pointer descriptor, processing path 636 is taken to processing block 638 where the reference to the effective address takes place. In this case, validation of the pointer reference has been successfully completed and a wild pointer reference has been prevented. Pointer reference logic terminates at END bubble 640 and processing control returns to a normal processing flow.

Referring back to decision block 624, if the pointer effective address is outside of the limits specified by the base address and limit address, processing path 626 is taken to processing block 642 where an error condition is signaled and pointer processing terminates at END bubble 640 without having referenced the pointer effective address. Similarly, if the pointer protection value specifies that access privilege for the pointer reference is not authorized, processing path 634 is taken to processing block 642 where the error condition is signaled. Again, in this error condition situation, the pointer reference is terminated at END bubble 640 without having accessed the pointer effective address.

It will be apparent to those skilled in the art that the present invention may be used in combination with those techniques of the prior art described earlier. Similarly, it will be apparent to those skilled in the art that pointer validation may be disabled for all pointers by simply not executing the pointer reference logic illustrated in FIGS. 6a and 6b.

Thus, a means and method is described for providing selectable pointer validation in a computer system.

Although the invention described herein with reference to a specific embodiment, many modifications and variations therein will readily occur to those skilled in the art. Accordingly, all such variations and modifications are included within the intended scope of the present invention as defined by the following claims.

What is claimed is:

1. In a computer system having a processor and a memory, a selective pointer validation system comprising:

a pointer having an effective address and a validation enable portion, said pointer for referencing a location in said memory corresponding to said effective address; and processing means for validating a reference made by said pointer, said processing means validating the reference made by said pointer only if said validation enable portion of said pointer is set to a value indicating that pointer validation is enabled.

2. The pointer validation system as claimed in claim 1 wherein said validation enable portion of said pointer is a single bit.

3. The pointer validation system as claimed in claim 1 wherein said processing means further includes means for reading said validation enable portion of said pointer.

4. The pointer validation system as claimed in claim 1 wherein the same location in said memory is referenced by said effective address regardless of the state of said validation enable portion of said pointer.

5. The pointer validation system as claimed in claim 1 further including means for preventing access to said location in said memory referenced by said effective address if said processing means determines that said pointer reference is invalid.

6. The pointer validation system as claimed in claim 1 further including a pointer descriptor table for storing a plurality of pointer descriptors, each pointer descriptor of said plurality of pointer descriptors being associated with a pointer, said pointer descriptors defining pointer access information.

7. The pointer validation system as claimed in claim 6 wherein said pointer access information includes one or more base addresses, one or more limit addresses, and access privilege information.

8. The pointer validation system as claimed in claim 7 wherein said access privilege information includes read, write, or execute privilege information.

9. In a computer system having a processor and a memory, a process for selectively validating a pointer comprising the steps of:

providing a pointer having an effective address and a validation enable portion, said pointer being used for referencing a location in said memory corresponding to said effective address; and validating a reference made by said pointer, said reference being validated only if said validation enable portion of said pointer is set to a value indicating that pointer validation is enabled.

10. The process as claimed in claim 9 wherein said validation enable portion of said pointer is a single bit.

11. The process as claimed in claim 9 wherein said validating step further includes reading said validation enable portion of said pointer.

12. The process as claimed in claim 9 wherein the same location in said memory is referenced by said effective address regardless of the state of said validation enable portion of said pointer.

13. The process as claimed in claim 9 further including a step of preventing access to said location in said memory referenced by said effective address if said pointer reference is invalid as determined in said validating step.

14. The process as claimed in claim 9 further including a step of storing a plurality of pointer descriptors in a pointer descriptor table, each said pointer descriptor of said plurality of pointer descriptors being associated with a pointer, said pointer descriptors defining pointer access information.

15. The process as claimed in claim 14 wherein said pointer access information includes a base address, a limit address, and access privilege information.

16. The process as claimed in claim 15 wherein said access privilege information includes read, write, or execute privilege information.

* * * * *